(12) United States Patent
Miyazaki et al.

(10) Patent No.: US 10,480,083 B2
(45) Date of Patent: Nov. 19, 2019

(54) STEAM ELECTROLYSIS CELL

(71) Applicant: NIPPON SHOKUBAI CO., LTD., Osaka (JP)

(72) Inventors: Kuninori Miyazaki, Hyogo (JP); Masatoshi Ikeda, Hyogo (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 200 days.

(21) Appl. No.: 15/326,741

(22) PCT Filed: May 20, 2015

(86) PCT No.: PCT/JP2015/064538
§ 371 (c)(1),
(2) Date: Jan. 17, 2017

(87) PCT Pub. No.: WO2016/017251
PCT Pub. Date: Feb. 4, 2016

(65) Prior Publication Data
US 2017/0211193 A1    Jul. 27, 2017

(30) Foreign Application Priority Data

Jul. 28, 2014 (JP) .................................. 2014-153129
Jul. 28, 2014 (JP) .................................. 2014-153130
Apr. 23, 2015 (JP) .................................. 2015-088544

(51) Int. Cl.
| | | |
|---|---|---|
| C25B 1/10 | (2006.01) | |
| C01G 51/00 | (2006.01) | |
| C25B 11/02 | (2006.01) | |
| C25B 11/04 | (2006.01) | |
| C25B 13/04 | (2006.01) | |

(52) U.S. Cl.
CPC .............. *C25B 1/10* (2013.01); *C25B 11/04* (2013.01); *C25B 13/04* (2013.01)

(58) Field of Classification Search
CPC .......... C25B 1/10; C25B 11/04; C25B 13/04; C25B 9/08; C25B 9/10
See application file for complete search history.

(56) References Cited

U.S. PATENT DOCUMENTS

| | | | |
|---|---|---|---|
| 2008/0213639 A1 | 9/2008 | Thorel | |
| 2009/0061284 A1* | 3/2009 | Blennow | C04B 35/47 |
| | | | 429/466 |
| 2014/0284220 A1 | 9/2014 | Sala et al. | |

FOREIGN PATENT DOCUMENTS

| | | |
|---|---|---|
| CN | 101275235 | 10/2008 |
| CN | 103296286 | 9/2013 |
| JP | 11-260376 | 9/1999 |
| JP | 2001-250563 | 9/2001 |
| JP | 2005-150122 | 6/2005 |
| JP | 2009-209441 | 9/2009 |
| WO | 2013/053858 | 4/2013 |

OTHER PUBLICATIONS

Notice of Reasons for Refusal dated May 15, 2018 in Japanese Patent Application No. 2014-153130, with English Translation.
Extended European Search Report dated Mar. 29, 2018 in European Application No. 15827561.0.
Bo et al., "Microstructural characterization and electrochemical properties of $Ba_{0.5}Sr_{0.5}Co_{0.8}Fe_{0.2}O_{3-\delta}$ and its application for anode of SOEC", International Journal of Hydrogen Energy, 33:6873-6877 (Oct. 16, 2008).
Ding et al., "Electrochemical performance of $BaZr_{0.1}Ce_{0.7}Y_{0.1}Yb_{0.1}O_{3-\delta}$ electrolyte based proton-conducting SOFC solid oxide fuel cell with layered perovskite $PrBaCo_2O_{5+\delta}$ cathode", Journal of Power Sources, 196:2602-2607 (Nov. 3, 2010).
International Search Report dated Aug. 18, 2015 in International (PCT) Application No. PCT/JP2015/064538.
Notice of Reasons for Refusal dated Dec. 11, 2018, in corresponding Japanese patent application No. 2015-088544, with English translation.
Notice of Reasons for Refusal dated Mar. 12, 2019 in corresponding Japanese Patent Application No. 2015-088544 with English translation.
Matsumoto et al., "Intermediate Temperature Sofc-Soec using Sr(Zr,Ce)03-Based Proton-Conductor, the Proceedings of the 53th Battery Symposium", p. 432, 2012, with English abstract, partial English translation (boxed portion) and cited in CA.
Goupil et al., "Selection and study of basic layered cobaltites as mixed ionic-electronic conductors for proton conducting fuel cells", Solid State Ionics, vol. 263, pp. 15-22, 2014.
Communication pursuant to Article 94(3) EPC dated Apr. 17, 2019 in corresponding European Patent Application No. 15827561.0.
Goupil et al., "Stability study of possible air electrode materials for proton conducting electrochemical cells", Solid State Ionics, vol. 209, pp. 36-42, 2012.

* cited by examiner

*Primary Examiner* — Nicholas A Smith
(74) *Attorney, Agent, or Firm* — Wenderoth, Lind & Ponack, L.L.P.

(57) ABSTRACT

The objective of the present invention is to provide a steam electrolysis cell of which current efficiency is high and by which hydrogen can be efficiently produced, and a method for producing hydrogen using the steam electrolysis cell. The steam electrolysis cell according to the present invention is characterized in comprising an anode layer, a cathode layer, and a proton conducting oxide electrolyte layer between the anode layer and the cathode layer, wherein the anode layer comprises a perovskite oxide, and the perovskite oxide comprises Ba and Co.

12 Claims, No Drawings

STEAM ELECTROLYSIS CELL

TECHNICAL FIELD

The present invention relates to a steam electrolysis cell of which current efficiency is high and by which hydrogen gas can be efficiently produced from water vapor, and to a method for producing hydrogen using the steam electrolysis cell.

BACKGROUND ART

Recently, a technology to prevent resource depletion and global warming has been required. In particular, in the electric power field, renewable energy has been developed without resorting to fossil resource. By such renewable energy, the emission of carbon dioxide, which is one of heat-trapping gases, can be reduced. Renewable energy, such as sunlight, solar heat, water power, wind power, geothermal energy and biomass, can be obtained from a renewable energy source, which is supplemented from nature steadily and recurrently. For example, hydrogen is produced from biomass and electric power is generated from the hydrogen and air using a fuel cell.

In water electrolysis field, steam electrolysis has attracted a great interest in the last few years. When $H_2O$ is subjected to electrolysis to produce hydrogen and oxygen by steam electrolysis, gaseous water vapor is used without using liquid water. Steam electrolysis has the potential to be higher efficiency compared to conventional low temperature electrolysis, since operation under high temperature is possible and a portion of the required energy can be supplied as thermal energy.

Conventionally, an oxygen ion conducting electrolyte has been exclusively used in steam electrolysis. For example, Patent Document 1 discloses a steam electrolysis technology in which yttria stabilized zirconia having an oxygen ion conductivity is used.

However, when steam electrolysis using an oxygen ion conducting solid electrolyte is performed, electrode reactions occurring at anode and cathode are represented as follows.

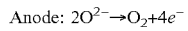
Anode: $2O^{2-} \rightarrow O_2 + 4e^-$

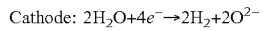
Cathode: $2H_2O + 4e^- \rightarrow 2H_2 + 2O^{2-}$

As the above formulae, in the above-described case, there is a problem that the step of separating the coexisting water vapor is additionally required, since hydrogen is generated at the cathode side.

In order to solve the problem, for example, the technology for steam electrolysis using a proton conducting electrolyte has been developed as described in Patent Document 2. In the invention, electrode reactions occurring at anode and cathode are represented as follows.

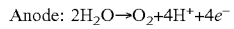
Anode: $2H_2O \rightarrow O_2 + 4H^+ + 4e^-$

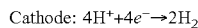
Cathode: $4H^+ + 4e^- \rightarrow 2H_2$

As the above formulae, in the above-described case, although hydrogen is generated at the cathode side similarly to the case of using an oxygen ion conducting electrolyte, the technology offers the advantage that it is not needed to separate hydrogen from water vapor, since water vapor is supplied to the anode side.

A perovskite oxide containing a transition metal in B site is used for an anode material of the steam electrolytic cell described in Patent Document 2, and the transition metal is exemplified by Co. In addition, Patent Document 3 discloses a perovskite oxide containing Ba and Co as a cathode material.

PRIOR ART DOCUMENT

Patent Document

Patent Document 1: JP 2005-150122 A
Patent Document 2: JP 2009-209441 A
Patent Document 3: JP 2001-250563 A

DISCLOSURE OF THE INVENTION

Problems to be Solved by the Invention

As described above, Patent Document 2 discloses a steam electrolysis cell which contains a proton conducting oxide electrolyte. However, the steam electrolysis cell described in Patent Document 2 has a disadvantage that, though a cell terminal voltage is low, current efficiency and hydrogen generation rate are also low.

In addition, it is described in Patent Document 3 that a perovskite oxide containing Ba and Co is used for a solid electrolyte and a cathode. However, such a solid electrolyte and cathode are intended to be applied to a fuel cell or a gas sensor, and it is not described in Patent Document 3 that the solid electrolyte and cathode are applied to a steam electrolytic cell.

The objective of the present invention is to provide a steam electrolysis cell of which current efficiency is high and by which hydrogen can be efficiently produced, and a method for producing hydrogen using the steam electrolysis cell.

Means for Solving the Problems

The inventors of the present invention made extensive studies to solve the above problems. As a result, the inventors completed the present invention by finding that high current efficiency can be achieved and hydrogen can be efficiently produced by using a perovskite oxide containing Ba and Co as a constituent component of an anode layer of a steam electrolysis cell.

Hereinafter, the present invention is described.

[1] A steam electrolysis cell,
comprising an anode layer, a cathode layer, and a proton conducting oxide electrolyte layer between the anode layer and the cathode layer,
wherein the anode layer comprises a perovskite oxide, and the perovskite oxide comprises Ba and Co.

[2] The steam electrolysis cell according to the above [1], wherein the perovskite oxide comprises 30% or more by molar ratio of Ba in A site and at least Co in B site.

[3] The steam electrolysis cell according to the above [1] or [2], wherein a part of the A site of the perovskite oxide is substituted by one or more elements selected from Sr, La, Ce, Pr, Nd, Sm, Eu, Gd and Yb.

[4] The steam electrolysis cell according to any one of the above [1] to [3], wherein the anode layer is formed from a raw material powder having BET specific surface area of 2.0 $m^2/g$ or more in a case where the raw material powder is calcined in the same condition as a sintering condition to form the anode layer.

[5] The steam electrolysis cell according to any one of the above [1] to [4], wherein the anode layer is formed by sintering at a temperature of 900° C. or lower.

[6] The steam electrolysis cell according to any one of the above [1] to [5], wherein the proton conducting oxide electrolyte layer comprises a perovskite oxide containing an alkaline earth metal in A site and a trivalent or tetravalent transition metal belonging to the group 4 element through the group 14 element in the periodic table in B site.

[7] The steam electrolysis cell according to any one of the above [1] to [6], wherein the cathode layer comprises one or more metal elements and a perovskite oxide, the metal element is selected from nickel, cobalt and iron, and the perovskite oxide contains an alkaline earth metal in A site and a trivalent or tetravalent transition metal belonging to the group 4 element through the group 14 element in the periodic table in B site.

[8] Use of a perovskite oxide as a raw material powder for forming an anode layer of a steam electrolysis cell, wherein the perovskite oxide comprises Ba and Co.

[9] The use according to the above [8], wherein the perovskite oxide comprises 30% or more by molar ratio of Ba in A site and at least Co in B site.

[10] The use according to the above [8] or [9], wherein a part of the A site of the perovskite oxide is substituted by one or more elements selected from Sr, La, Ce, Pr, Nd, Sm, Eu, Gd and Yb.

[11] The use according to any one of the above [8] to [10], wherein the anode layer is formed from a raw material powder having BET specific surface area of 2.0 $m^2/g$ or more in a case where the raw material is calcined in the same condition as a sintering condition to form the anode layer.

[12] A method for producing hydrogen, comprising the steps of supplying a water vapor-containing gas to the anode layer of the steam electrolysis cell according to any one of the above [1] to [7] and applying voltage between the anode layer and the cathode layer.

Effect of the Invention

When the steam electrolysis cell according to the present invention is used, the voltage required to obtain a desired current is substantially the same as that of a conventional steam electrolytic cell. Nevertheless, hydrogen generation rate per electrode area at a current density of more than 0.1 $A/cm^2$ is larger in comparison with a conventional steam electrolysis cell. The steam electrolysis cell according to the present invention is therefore very suitable for industry, since hydrogen can be efficiently produced with lower energy.

MODE FOR CARRYING OUT THE INVENTION

Hereinafter, first, a method for producing the steam electrolysis cell according to the present invention is described.

1. Proton Conducting Oxide Electrolyte Layer

A steam electrolysis cell is mainly classified into an electrolyte supported cell and an electrode supported cell. In the case of an electrolyte supported cell, an electrolyte layer is generally prepared at first, since a sintering temperature of an electrolyte layer is the highest among an electrolyte layer, an anode layer and a cathode layer. In the case of an electrode supported cell, an electrolyte layer is formed on an electrode layer as a support layer.

As a raw material of the proton conducting oxide electrolyte used in the present invention, a proton conducting oxide can be exemplified. Such a proton conducting oxide is exemplified by a perovskite oxide having a structure of $ABO_3$ type, a pyrochlore oxide having a structure of $A_2B_2O_7$ type, a ceria-rare earth oxide solid solution or a ceria-alkaline earth metal oxide solid solution, and a metal oxide having a brownmillerite type structure.

It is preferred that a perovskite oxide having a $ABO_3$ type structure is preferably used as a raw material of the proton conducting oxide electrolyte, since the anode layer contains a perovskite oxide as a main component. Such a perovskite type metal oxide is preferably exemplified by a perovskite oxide having an alkaline earth metal in A site and a trivalent or tetravalent transition metal belonging to the group 4 element through the group 14 element in the periodic table in B site. The element in the B site is more preferably exemplified by Zr, Ce, Ti or Sc. Furthermore, it is preferred to use a perovskite of which at least a part of one of A site and B site is substituted by one or more elements selected from La, Ce, Pr, Nd, Sm, Gd, Eu, Yb, Sc, Y, In, Ga, Fe, Co, Ni, Zn, Ta and Nb, and particularly it is preferred to use a perovskite of which a part of at least one of A site and B site is substituted by one or more elements selected from La, Ce, Pr, Nd, Sm, Gd, Eu, Yb, Sc, Y, In and Ga. Specifically, Sr—Zr—Y type, Sr—Zr—Ce—Y type, Ca—Zr—In type, La—Sc type, Sr—Ce—Yb type and La—Sr—Ti—Nb type perovskites can be exemplified.

The thickness of the proton conducting oxide electrolyte layer is not particularly restricted, and may be appropriately determined depending on the cell shape or the like. For example, in the case of an electrolyte supported cell, the thickness is preferably 50 µm or more and 500 µm or less. When the thickness is less than 50 µm, proton conductivity can be secured but cell strength may not be possibly secured sufficiently. On the one hand, when the thickness is more than 500 µm, there may be a possibility that trouble occurs in the proton conductivity. In other words, when the thickness is 50 µm or more and 500 µm or less, it becomes possible to ensure both of the cell strength and proton conductivity more reliably. In the case of an electrode supported cell, the thickness is preferably 1 µm or more and 50 µm or less. If the thickness is 1 µm or more, the proton conducting electrolyte layer can be more easily formed even by an industrial process such as screen printing. On the one hand, the thickness is 50 µm or less, proton conductivity can be ensured more reliably as compared with an electrode supported cell. In the present invention, an electrode supported cell is more preferred.

As a method for preparing a proton conducting oxide electrolyte layer, the following method is exemplified. To a proton conducting oxide, an organic solvent such as ethanol and terpineol, a dispersant, a plasticizer, and a binder such as ethyl cellulose are added. The mixture is subjected to wet pulverization using a ball mill or the like to obtain a slurry. Then, a green sheet is prepared with a doctor blade method or the like and sintered to obtain a proton conducting oxide electrolyte layer. In the case of an electrode supported cell, the above-described slurry was applied onto an electrode layer as a support layer and then sintered to form a proton conducting oxide electrolyte layer on the electrode support layer.

2. Formation of Anode Layer

When the steam electrolysis cell according to the present invention is an electrolyte supported cell, an anode layer paste and a cathode layer paste are applied on the proton conducting oxide electrolyte layer and then sintered. The anode layer and cathode layer may be formed by applying each paste on the proton conducting oxide electrolyte layer and coinstantaneously sintering the pastes. However, in general, since the sintering temperatures for an anode layer and cathode layer are not necessarily similar to each other, it is preferred that an electrode layer of which sintering temperature is higher is formed first and then the other electrode layer is formed.

When the steam electrolysis cell according to the present invention is an electrode supported cell, the electrolyte layer is formed on an electrode layer as a support layer and the other electrode layer is formed on the electrolyte layer. In such a case, in general, an electrolyte layer is formed on a cathode layer or a precursor thereof as a support layer and an anode layer is further formed on the electrolyte layer, since the sintering temperature for a cathode layer is higher than that for an anode layer.

The anode layer of the steam electrolytic cell according to the present invention exhibits a catalytic activity to accelerate the reaction of $2H_2O \rightarrow O_2 + 4H^+ + 4e^-$ and surely has an electrical conductivity. As such a material, a perovskite oxide containing a transition metal element as a catalyst component to accelerate the above-described reaction may be used, and a perovskite oxide containing Ba and Co is used as a main component in the present invention. When the steam electrolytic cell according to the present invention for which such a perovskite oxide is used as the anode layer raw material is used, high current efficiency can be obtained and hydrogen can be efficiently produced.

As described above, the main component of the anode layer of the steam electrolysis cell according to the present invention is a perovskite oxide containing Ba and Co. In the present invention, the phrase "the main component of the anode layer is the perovskite oxide" means that, when the anode layer is formed, the ratio of the perovskite oxide in the raw material of the component which constitutes the anode layer without the material removed by sintering, such as a binder and solvent, is 60 v/v % or more. The ratio is preferably 65 v/v % or more, more preferably 70 v/v % or more, and even more preferably 75 v/v % or more. On the one hand, the upper limit of the ratio is not particularly restricted and 100 v/v % without an inevitable impurity and an inevitable residue may be the perovskite oxide. However, since the anode layer may contain other component as described later, the ratio is preferably 95 v/v % or less, more preferably 90 v/v % or less, and even more preferably 85 v/v % or less.

Ba is one kind of an alkaline earth metal. In general, Ba is located in the A site and Co is located in the B site of the perovskite oxide.

The ratio of Ba in the metal element located in the A site of the perovskite oxide is preferably 30% or more by mole. When the molar ratio is 30% or more, the function effect of Ba in addition to Co can be sufficiently exhibited, and it becomes possible more surely that high current efficiency can be achieved and hydrogen can be efficiently produced by using the steam electrolysis cell according to the present invention. The molar ratio is more preferably 35% or more, even more preferably 40% or more, and particularly preferably 45% or more. On the one hand, the upper limit of the molar ratio may be 100%, but the molar ratio is more preferably 90% or less, even more preferably 80% or less, and particularly preferably 70% or less. The element which may substitute a part of the A site of the perovskite oxide is exemplified by one or more elements selected from Sr, La, Ce, Pr, Nd, Sm, Eu, Gd and Yb, and is more preferably one or more elements selected from Sr, La, Sm and Gd.

The ratio of Co in the metal element located in the B site of the perovskite oxide is not particularly restricted and may be appropriately adjusted. For example, the ratio is preferably 50% or more by mole. When the molar ratio is 50% or more, the function effect of Co in addition to Ba can be sufficiently exhibited, and it becomes possible more surely that high current efficiency can be achieved and hydrogen can be efficiently produced by using the steam electrolysis cell according to the present invention. The molar ratio is more preferably 60% or more, 70% or more or 80% or more, and particularly preferably 90% or more or 95% or more. On the one hand, the upper limit of the molar ratio is preferably 100%. The element which may substitute a part of the B site of the perovskite oxide is exemplified by at least one of Ni and Fe.

The component except of the above-described constituent of the anode layer is exemplified by the component for a proton conducting oxide electrolyte raw material and electron conducting raw material.

It is preferred that an electron conducting component in addition to the above-described perovskite oxide is added into the anode layer of the steam electrolysis cell according to the present invention. Such an electron conducting component is exemplified by a metal such as silver, nickel, cobalt, iron, platinum, palladium and ruthenium; a metal oxide which is changed to an electron conducting metal in a reducing atmosphere or an air atmosphere, such as silver oxide, nickel oxide, cobalt oxide and iron oxide; and a composite metal oxide in which two or more the exemplified oxides are contained, such as nickel ferrite and cobalt ferrite. One of the above components may be used alone, or two or more of the above components may be combined to be used if necessary. Among the components, silver, metal nickel, metal cobalt, metal iron, and an oxide thereof are preferred.

The amount of the electron conducting component to be used is not restricted and may be appropriately adjusted. For example, a ratio by mass in the whole electrode is preferably 2.0 mass % or more and 25 mass % or less. When the ratio is 2.0 mass % or more, the electron conductivity can be more surely exhibited. On the one hand, since a porosity of the electrode may be possibly decreased excessively when the ratio is too large, the ratio is preferably 25 mass % or less.

The thickness of the anode layer is not particularly restricted, and may be appropriately determined depending on the cell shape or the like. For example, the thickness is preferably within the range of 5 μm or more and 100 μm or less in both of an electrolyte supported cell and an electrode supported cell.

The anode layer may be formed by an ordinary method. For example, similarly to the case of the proton conducting oxide electrolyte layer, a paste containing the above-described constituent is prepared and applied on the above-described proton conducting oxide electrolyte layer so that the predetermined thickness can be obtained, and then sintered. In the case of an electrode supported cell having the electrode layer as a support layer, after the electrode layer which plays a role of a support is formed, the proton conducting oxide electrolyte layer is formed thereon and the other electrode layer is formed on the electrolyte layer. Alternatively, under the electrode layer, a porous support layer may be formed.

The sintering temperature for forming the anode layer is preferably 900° C. or lower and more preferably 850° C. or lower from the viewpoint of current efficiency.

In the present invention, it is preferred to use a powder having BET specific surface area of 2.0 $m^2/g$ or more in a case where the powder is calcined in the same condition as a sintering condition to form the anode layer as a raw material powder to form the anode layer. When a raw material powder having the BET specific surface area of 2.0 m²/g or more is used to form the anode layer, hydrogen can be efficiently produced by further improving hydrogen generation rate and current efficiency of the steam electrolysis cell. The BET specific surface area is more preferably 2.1 m²/g or more, 2.2 m²/g or more or 2.4 m²/g or more, even more preferably 2.5 m²/g or more or 3.0 m²/g or more, and particularly preferably 3.4 m²/g or more or 4.0 m²/g or more. When the BET specific surface area is larger, the production efficiency of hydrogen is further improved. However, when the BET specific surface area is excessively large, the strength of the anode layer may not be possibly ensured sufficiently. Accordingly, the BET specific surface area is preferably 15 m²/g or less, more preferably 10 m²/g or less, and even more preferably 8 m²/g or less. Since the above-described sintering of the raw material powder for the anode layer is carried out to measure the BET specific surface area as the standard of the present invention, the raw material powder which is not sintered is used when the anode layer is actually formed. In other words, the above-described sintering and measurement of the BET specific surface area are carried out separately from the formation of the anode layer.

For example, in order to adjust the BET specific surface area of the raw material powder calcined under the same condition as the sintering condition for the formation of the anode layer to a predetermined range, the constituent element, composition ratio, pulverization condition and pulverization method before the raw material powder is calcined may be adjusted. Specifically, any one of dry pulverization, wet pulverization and frost pulverization may be employed as a pulverization method, and a ball mill, a beads mill, an attritor, a rod mill, a hammer mill, a freezer mill, a jet mill or the like may be used. The condition is appropriately determined depending on the above-described pulverization method or the property of a pulverizer and may not be flatly specified. For example, when a rotary pulverizer such as a ball mill, a beads mill and an attritor is used, pulverization may be carried out at a rotation speed of 10 rpm or more and 150 rpm or less for 1 hour or more and 200 hours or less, and wet pulverization is preferably carried out at a rotation speed of 50 rpm or more and 100 rpm or less for 1 hour or more and 200 hours or less.

BET specific surface area means a surface area calculated by adsorbing nitrogen on a substance to be measured at −196° C. as a temperature of liquid nitrogen and assigning the measured amount of adsorbed nitrogen to BET equation.

3. Formation of Cathode Layer

The cathode layer of the cell according to the present invention exhibits a catalytic activity to accelerate the reaction of $4H^+ + 4e^- \rightarrow 2H_2$ and surely has an electrical conductivity. As such a material, in addition to a metal element such as Pt, Pd, Ni, Co, Fe and Ru, a mixture of the metal element and the perovskite oxide as the raw material of the proton conducting oxide electrolyte layer is exemplified, and the mixture of the metal element and the perovskite oxide is preferred in terms of the affinity and adhesiveness to the proton conducting oxide electrolyte layer.

A raw material of the metal element is exemplified by a metal such as Pt, Pd, Ni, Co, Fe and Ru; a metal oxide which is changed to an electron conducting metal in a reducing atmosphere, such as nickel oxide, cobalt oxide and iron oxide; or a composite metal oxide in which two or more of the exemplified oxides are contained, such as nickel ferrite and cobalt ferrite. One of the above components may be used alone, or two or more of the above components may be combined to be used if necessary. Among the components, nickel, cobalt and iron are preferred as the metal element.

As the proton conducting metal oxide, a perovskite oxide having an alkaline earth metal in A site and a trivalent or tetravalent transition metal belonging to the group 4 element through the group 14 element in the periodic table in B site is exemplified, and the element contained in the B site is more preferably exemplified by Zr, Ce, Ti and Sc. In addition, it is preferred to use a perovskite oxide of which a part of at least one of A site and B site is substituted with one or more elements selected from La, Ce, Pr, Nd, Sm, Gd, Eu, Yb, Sc, Y, In, Ga, Fe, Co, Ni, Zn, Ta and Nb, and particularly to use a perovskite oxide of which a part of at least one of A site and B site is substituted with one or more elements selected from La, Ce, Pr, Nd, Sm, Gd, Eu, Yb, Sc, Y, In and Ga. Specifically, a perovskite oxide of Sr—Zr—Y type, Sr—Zr—Ce—Y type, Ca—Zr—In type, La—Sc type, Sr—Ce—Yb type, La—Sr—Ti—Nb type and the like are exemplified.

When a mixture of the metal element and the perovskite oxide is used as a cathode layer raw material, the ratios thereof are not particularly restricted, and may be appropriately adjusted in consideration of electron conductivity and catalytic ability of the material to be specifically used. For example, the ratio of the perovskite oxide to the total of the metal element material and the perovskite oxide may be adjusted to 20 v/v % or more and 80 v/v % or less, and is more preferably 25 v/v % or more and more preferably 70 v/v % or less.

The thickness of the cathode layer is not particularly restricted, and may be appropriately determined depending on the cell shape or the like. For example, in the case of an electrolyte supported cell, the thickness is preferably adjusted to 5 μm or more and 100 μm or less. In the case of an electrode supported cell in which the electrode layer is a support layer, the thickness is preferably adjusted to 100 μm or more and 2000 μm or less. The reason by which the lower limit and upper limit are determined is the same as that of the case of an electrolyte supported cell.

The cathode layer may be formed by an ordinary method. For example, similarly to the case of the proton conducting oxide electrolyte layer, the paste containing the above-described constituent is prepared and applied on the above-described proton conducting oxide electrolyte layer so that the predetermined thickness can be obtained, and then sintered. In the case of an electrode supported cell having the electrode layer as a support layer, after the electrode layer which plays a role of a support is formed, the proton conducting oxide electrolyte layer is formed thereon and the other electrode layer is formed on the electrolyte layer. Alternatively, under the electrode layer, a porous support layer may be formed. When a metal oxide is used as the metal element material, the metal oxide is reduced to a metal element by performing aggressive reduction treatment; as a result, the volume of the cathode layer is decreased to be porous depending on the portion thereof. The hydrogen production performance of the steam electrolytic cell having such a porous cathode layer is much higher.

For example, the sintering condition to form the cathode layer may be adjusted to at 900° C. or higher and 1500° C. or lower for 1 hour or more and 5 hours or less. When the sintering temperature is less than 900° C., the performance may be possibly degraded by insufficient strength and delamination. On the one hand, the sintering temperature is more than 1500° C., the cathode may possibly become dense and the diffusion of gas may be possibly decreased. The sintering temperature is preferably 1000° C. or higher and 1500° C. or lower, and more preferably 1100° C. or higher and 1500° C. or lower.

By using the steam electrolysis cell according to the present invention in which the specific anode layer and a cathode layer are respectively laminated on each surface of a proton conducting oxide electrolyte layer as described above, hydrogen can be efficiently produced even at relatively low voltage. Hereinafter, a method for producing hydrogen according to the present invention is described.

4. Method for Producing Hydrogen

Hydrogen can be efficiently produced by using the steam electrolysis cell according to the present invention and supplying water vapor to the anode layer with applying a voltage between the electrodes. The current efficiency of the steam electrolysis cell according to the present invention is higher than that of a conventional cell. The current efficiency of the steam electrolysis cell according to the present invention is higher than a conventional cell. A current efficiency corresponds to an efficiency for producing hydrogen to a passed current. Such a difference is more remarkable, when current density is higher.

In general, a steam electrolytic cell has a laminate of an anode layer, an electrolyte layer and a cathode layer, and the laminate is sandwiched between a pair of separators. A separator is used to separate an anode layer side atmosphere from a cathode layer side atmosphere so that the atmospheres are not mixed and not to leak out water vapor and generated hydrogen. Such a separator has a flow path to supply water vapor to an anode layer and a flow path to eject unreacted gas and generated hydrogen gas. As a material for a separator, a carbon material, a composite material of a resin and a carbon material, stainless steel and aluminum are used in terms of conductive property and gas impermeability.

In order to produce hydrogen by using the steam electrolysis cell according to the present invention, a voltage is applied between the anode layer and the cathode layer with supplying water vapor-containing gas to the anode layer. Such a water vapor-containing gas may be substantially water vapor only other than an inevitable impurity, or may further contain oxygen or inert gas such as nitrogen and argon as a carrier gas. When such a mixed gas is used as water vapor-containing gas, a ratio of water vapor in the whole water vapor-containing gas is preferably adjusted to 20 v/v % or more and 98 v/v % or less.

An amount of water vapor-containing gas to be supplied to the anode layer may be appropriately adjusted depending on the performance of the steam electrolysis cell to be used, a voltage applied to the cell, a ratio of water vapor in water vapor-containing gas, or the like.

A voltage applied between the anode layer and the cathode layer may be appropriately adjusted, and may be generally adjusted to about 1.1 V or more and about 3 V or less.

When hydrogen is produced by using the steam electrolysis cell according to the present invention, only hydrogen is generated at the cathode side in theory. However, a mixed gas is used as a raw material gas, hydrogen may be further separated from the obtained hydrogen-containing gas.

The present application claims the benefit of the priority dates of Japanese patent application No. 2014-153129 filed on Jul. 28, 2014, Japanese patent application No. 2014-153130 filed on Jul. 28, 2014, and Japanese patent application No. 2015-88544 filed on Apr. 23, 2015. All of the contents of the Japanese patent application No. 2014-153129 filed on Jul. 28, 2014, Japanese patent application No. 2014-153130 filed on Jul. 28, 2014, and Japanese patent application No. 2015-88544 filed on Apr. 23, 2015, are incorporated by reference herein.

EXAMPLES

Hereinafter, the present invention is described in more detail with Examples. However, the present invention is not restricted to the following Examples in any way, and it is possible to work the present invention according to the Examples with an additional appropriate change within the range of the above descriptions and the following descriptions. Such a changed embodiment is also included in the technical scope of the present invention.

Example 1

(1) Preparation of Cathode Support

Commercially available nickel oxide powder (product name "Green" manufactured by SEIDO CHEMICAL INDUSTRY CO., LTD.) and $SrZr_{0.5}Ce_{0.4}Y_{0.1}O_{3-\delta}$ powder as an electrolyte powder were weighed so that the ratio of the nickel oxide powder became 50 vol % and the ratio of the electrolyte powder became 50 vol %, and were stirred and mixed in an organic solvent using a mortar to obtain a mixture. The mixture was subjected to single-axis press molding and isostatic hydrostatic press molding to be formed into a circular plate. The circular plate was sintered at 1250° C. for 10 hours to prepare an electrode support having a diameter of 25 mm and a thickness of 0.5 mm.

(2) Preparation of Proton Conducting Oxide Electrolyte Layer $SrZr_{0.5}Ce_{0.4}Y_{0.1}O_{3-\delta}$, ethyl cellulose and α-terpineol were mixed using a mortar. Then, the mixture was further mixed and kneaded using a three-roll mill (model name "M-80S" manufactured by EXAKT technologies Inc.) to obtain an electrolyte paste.

The paste was applied on the above-described electrode support by screen printing method and dried, and then sintered at 1400° C. under air atmosphere for 2 hours to form a proton conducting electrolyte layer having a thickness of 20 μm.

(3) Preparation of $La_{0.5}Ba_{0.5}CoO_{3-\delta}$ Anode Layer

Commercially available powders of $La_2O_3$, $BaCO_3$ and $Co_3O_4$ having purities of 99.9 mass % were mixed so that the composition of the mixture became $La_{0.5}Ba_{0.5}CoO_{3-\delta}$. After ethanol was added to the obtained mixture and the mixture was wet-pulverized using a ball mill for 60 hours, the mixture was dried at 120° C. for 10 hours. Then, the mixture was calcined at 1100° C. for 10 hours to obtain a calcined powder. After ethanol was further added to the obtained calcined powder and the powder was wet-pulverized using a ball mill for 100 hours, the powder was dried at 120° C. for 10 hours to obtain an electrode catalyst powder which could be used as an anode layer raw material for steam electrolysis. The composition of the obtained electrode catalyst powder was $La_{0.5}Ba_{0.5}CoO_{3-\delta}$, and it was confirmed by X-ray diffraction that the powder had a single phase consisting of a perovskite.

The above-described electrode catalyst powder and Ago powder (manufactured by Wako Pure Chemical Industries, Ltd.) were mixed so that the volume ratio of the electrode catalyst powder and Ago became 8:2. Ethyl cellulose as a binder and α-terpineol as a solvent were further added thereto and mixed in a mortar. Then, the mixture was kneaded using a three-roll mill (Model name: "M-80S" manufactured by EXAKT technologies Co.) to obtain an anode paste.

On the proton conducting electrolyte at the other side of the electrode support layer, the anode paste was applied by screen printing method. Then, the laminated body was sintered under air atmosphere at 850° C. for 1 hour to form an anode layer having a thickness of 30 µm.

Comparative Example 1

A cell was prepared in a similar manner to the above-described Example 1 except that the composition of the anode layer was changed to $Sm_{0.5}Sr_{0.5}CoO_{3-\delta}$ by using commercially available $Sm_2O_3$, $SrCO_3$ and $Co_3O_4$ powder having purities of 99.9 mass %.

Example 2

A cell was prepared in a similar manner to the above-described Example 1 except that the temperature to sinter the anode layer was changed to 800° C.

Example 3

A cell was prepared in a similar manner to the above-described Example 1 except that the temperature to sinter the anode layer was changed to 900° C.

Example 4

A cell was prepared in a similar manner to the above-described Example 1 except that the ratio of the perovskite oxide in the cathode layer was changed to 28 vol % and the ratio of nickel oxide powder was changed to 72 vol %.

Example 5

A cell was prepared in a similar manner to the above-described Example 4 except that the composition of the anode layer was changed to $La_{0.6}Ba_{0.4}CoO_{3-\delta}$.

Example 6

A cell was prepared in a similar manner to the above-described Example 4 except that the composition of the anode layer was changed to $La_{0.4}Ba_{0.6}CoO_{3-\delta}$.

Example 7

A cell was prepared in a similar manner to the above-described Example 4 except that the composition of the anode layer was changed to $La_{0.5}Ba_{0.5}Co_{0.9}Fe_{0.1}O_{3-\delta}$.

Comparative Example 2

A cell was prepared in a similar manner to the above-described Comparative Example 1 except that the composition of the anode layer was changed to $La_{0.5}Sr_{0.5}CoO_{3-\delta}$.

Comparative Example 3

A cell was prepared in a similar manner to the above-described Comparative Example 1 except that the sintering temperature to form the anode layer was changed to 950° C.

Test Example 1

The cells prepared by the above-described Examples 1 to 7 and Comparative Examples 1 to 3 were sandwiched by glass rings so that the glass ring did not contacted with the anode layer, and the glass rings were soften at 800° C. for gas seal. Then, after the temperature was decreased to 600° C. as a working temperature, porous Ni—$SrZr_{0.5}Ce_{0.4}Y_{0.1}O_{3-\delta}$ cathode layer was prepared from the electrode support by supplying N2 gas containing 10 v/v % hydrogen gas to reduce NiO in the electrode support. Argon gas containing 20 v/v % water vapor and 1 v/v % oxygen was supplied to the anode layer side at a flow rate of 100 NmL/min, and argon gas containing 2 v/v % water vapor and 1 v/v % hydrogen was supplied to the cathode layer side at a flow rate of 100 NmL/min. In order to obtain a current-voltage curve, a potentiogalvanostat was used and a voltage was measured while a current was changed.

In addition, the concentration of hydrogen generated in the cathode layer was measured by gas chromatography, and the flow rate of cathode outlet gas was measured using a high precision film flow meter (manufactured by HORIBA, Ltd.). Hydrogen generation rate was calculated by the following formula from the obtained measurement values.

Hydrogen generation rate($\mu$mol/h·cm$^2$)=[{($Qv0 \times Hc0$/100)−($Qv1 \times Hc1$/100)}]×60×10$^6$]/(22400×$S$)

Qv0: cathode outlet gas flow rate under open circuit (NmL/min)

Hc0: Hydrogen concentration in the cathode outlet gas under open circuit (v/v %)

Qv1: cathode outlet gas flow rate under applied voltage (NmL/min)

Hc1: Hydrogen concentration in the cathode outlet gas under applied voltage (v/v %)

S: electrode area in the anode of the anode (cm$^2$) In addition, theoretical hydrogen generation rate was calculated by the following formula.

Theoretical hydrogen generation rate($\mu$mol/h·cm$^2$)= {applied current($A$)×3600($s$)×10$^6$}/{2×$F$×current area(cm$^2$)}

F: Faraday constant

Furthermore, current efficiency was calculated by the following formula from the hydrogen generation rate based on the measurement value and the theoretical hydrogen generation rate. The results are shown in Table 1.

Current efficiency (%)=(hydrogen generation rate/theoretical hydrogen generation rate)×100

Test Example 2

After the anode layer raw material powders used in the above-described Examples 1 to 7 and Comparative Examples 1 to 3 were calcined under the same conditions as the sintering conditions for forming each anode layer, BET specific surface area was measured using a BET specific surface area meter ("Macsorb HM-1210" manufactured by Mountech Co., Ltd.). Specifically, the measurement sample was charged into the cell of the BET specific surface area meter, and degassed at 200° C. for 30 minutes while nitrogen gas was flown at a rate of 100 mL/min into the cell. After the degassing treatment, the cell was immersed in liquid nitrogen to adsorb nitrogen on the measurement sample while nitrogen gas was flown at a rate of 50 mL/min into the cell. Then, the cell was maintained under an ordinary temperature, and an amount of desorbed nitrogen was measured to obtain the BET specific surface area. The measurement was conducted three times per one sample, and the average thereof was calculated. The result is shown in Table 1.

TABLE 1

|  | BET specific surface area of raw material powder for anode layer | Ratio of NiO/perovskite oxide | $H_2$ generation rate at 0.5 A/cm$^2$ | Current efficiency |
|---|---|---|---|---|
| Example 1 | 4.7 m$^2$/g | 50/50 | 7740 μmol/h · cm$^2$ | 83% |
| Example 2 | 4.9 m$^2$/g | 50/50 | 7730 μmol/h · cm$^2$ | 83% |
| Example 3 | 3.4 m$^2$/g | 50/50 | 7060 μmol/h · cm$^2$ | 76% |
| Example 4 | 4.7 m$^2$/g | 72/28 | 7470 μmol/h · cm$^2$ | 80% |
| Example 5 | 3.6 m$^2$/g | 72/28 | 7170 μmol/h · cm$^2$ | 77% |
| Example 6 | 4.5 m$^2$/g | 72/28 | 7240 μmol/h · cm$^2$ | 78% |
| Example 7 | 4.4 m$^2$/g | 72/28 | 7260 μmol/h · cm$^2$ | 78% |
| Comparative Example 1 | 2.5 m$^2$/g | 50/50 | 6430 μmol/h · cm$^2$ | 69% |
| Comparative Example 2 | 2.8 m$^2$/g | 50/50 | 6900 μmol/h · cm$^2$ | 74% |
| Comparative Example 3 | 1.5 m$^2$/g | 50/50 | 3810 μmol/h · cm$^2$ | 41% |

As the results shown in Table 1, when the cells according to the present invention of which anode layers have a perovskite oxide containing Ba and Co (Examples 1 to 7) are compared with the conventional cells of which anode layers do not contain Ba (Comparative Examples 1 to 3), hydrogen generation rate relative to current density of the present invention cell is apparently higher in comparison with that of the conventional cell. Thus, the current efficiency is improved. From the above experimental result, it was demonstrated that high current efficiency can be achieved and hydrogen can be efficiently produced by using a perovskite oxide containing both of Ba and Co as an anode material.

In addition, it was found that when a raw material powder of which BET specific surface area in the case of calcining the powder in the same condition as that of the preparation of the anode layer is lower than 2.0 m$^2$/g is used for forming the anode layer, hydrogen generation rate and current efficiency are not sufficient.

The invention claimed is:

1. A steam electrolysis cell,
comprising an anode layer, a cathode layer, and a proton conducting oxide electrolyte layer between the anode layer and the cathode layer,
wherein the anode layer is formed by sintering at a temperature of 900° C. or lower and comprises a perovskite oxide having an ABO$_3$ type structure,
the perovskite oxide comprises Ba and Co,
a part of the A site of the perovskite oxide is substituted by La, and
a molar ratio of Co in the B site of the perovskite oxide is 90% or more.

2. The steam electrolysis cell according to claim 1, wherein the perovskite oxide comprises 30% or more by molar ratio of Ba in the A site.

3. The steam electrolysis cell according to claim 1, wherein in addition to the La, a part of the A site of the perovskite oxide is further substituted by one or more elements selected from the group consisting of Sr, Ce, Pr, Nd, Sm, Eu, Gd and Yb.

4. The steam electrolysis cell according to claim 1, wherein the anode layer is formed from a raw material powder having a BET specific surface area of 2.0 m$^2$/g or more in a case where the raw material powder is calcined in the same condition as a sintering condition to form the anode layer.

5. The steam electrolysis cell according to claim 1, wherein the proton conducting oxide electrolyte layer comprises a perovskite oxide having an ABO$_3$ type structure containing an alkaline earth metal in the A site and a trivalent or tetravalent transition metal belonging to the group 4 elements through the group 14 elements in the periodic table in the B site.

6. The steam electrolysis cell according to claim 1, wherein the cathode layer comprises one or more metal elements and a perovskite oxide having an ABO$_3$ type structure,
wherein the metal element is selected from the group consisting of nickel, cobalt and iron, and
the perovskite oxide contains an alkaline earth metal in the A site and a trivalent or tetravalent transition metal belonging to the group 4 elements through the group 14 elements in the periodic table in the B site.

7. A method for producing hydrogen, comprising the steps of
supplying a water vapor-containing gas to an anode layer of a steam electrolysis cell comprising the anode layer, a cathode layer, and a proton conducting oxide electrolyte layer between the anode layer and the cathode layer, wherein the anode layer comprises a perovskite oxide having an ABO$_3$ type structure, the perovskite oxide comprises Ba and Co, and a molar ratio of Co in the B site of the perovskite oxide is 90% or more, and
applying voltage between the anode layer and the cathode layer,
wherein a part of the A site of the perovskite oxide is substituted by La, and
wherein the anode layer is formed by sintering at a temperature of 900° C. or lower.

8. The method according to claim 7, wherein the perovskite oxide comprises 30% or more by molar ratio of Ba in the A site.

9. The method according to claim 7, wherein in addition to the La, a part of the A site of the perovskite oxide is further substituted by one or more elements selected from the group consisting of Sr, Ce, Pr, Nd, Sm, Eu, Gd and Yb.

10. The method according to claim 7, wherein the anode layer is formed from a raw material powder having a BET specific surface area of 2.0 m$^2$/g or more in a case where the raw material powder is calcined in the same condition as a sintering condition to form the anode layer.

11. The method according to claim 7, wherein the proton conducting oxide electrolyte layer comprises a perovskite oxide having an ABO$_3$ type structure containing an alkaline earth metal in the A site and a trivalent or tetravalent transition metal belonging to the group 4 elements through the group 14 elements in the periodic table in the B site.

12. The method according to claim 7, wherein the cathode layer comprises one or more metal elements and a perovskite oxide having an ABO$_3$ type structure,
the metal element is selected from the group consisting of nickel, cobalt and iron, and
the perovskite oxide contains an alkaline earth metal in the A site and a trivalent or tetravalent transition metal belonging to the group 4 elements through the group 14 elements in the periodic table in the B site.

* * * * *